(12) United States Patent
Kent

(10) Patent No.: US 11,647,339 B2
(45) Date of Patent: May 9, 2023

(54) MIMO COMMUNICATION SYSTEM AND DATA LINK

(71) Applicant: BAE SYSTEMS plc, London (GB)

(72) Inventor: Lionel William Kent, Chelmsford Essex (GB)

(73) Assignee: BAE SYSTEMS PLC, London (GB)

(*) Notice: Subject to any disclaimer, the term of this patent is extended or adjusted under 35 U.S.C. 154(b) by 895 days.

(21) Appl. No.: 16/467,827

(22) PCT Filed: Nov. 27, 2017

(86) PCT No.: PCT/GB2017/053554
§ 371 (c)(1),
(2) Date: Jun. 7, 2019

(87) PCT Pub. No.: WO2018/104702
PCT Pub. Date: Jun. 14, 2018

(65) Prior Publication Data
US 2020/0204270 A1    Jun. 25, 2020

(30) Foreign Application Priority Data
Dec. 8, 2016    (GB) ...................................... 1620851

(51) Int. Cl.
*H04R 17/10*    (2006.01)
*B06B 1/06*     (2006.01)
(Continued)

(52) U.S. Cl.
CPC ........... *H04R 17/10* (2013.01); *B06B 1/0618* (2013.01); *B06B 1/0644* (2013.01); *G01N 29/28* (2013.01);
(Continued)

(58) Field of Classification Search
CPC ........ H04B 1/40; H04B 11/00; H04L 27/0002
See application file for complete search history.

(56) References Cited

U.S. PATENT DOCUMENTS 5,869,767 A * 2/1999 Hayward .............. B06B 1/0611
                                                 310/345
6,895,825 B1 * 5/2005 Barkhoudarian ....... G01F 1/662
                                                 73/861.28

(Continued)

FOREIGN PATENT DOCUMENTS

WO    WO-2012104602 A1 *  8/2012 ............. B32B 37/12
WO       2013147999 A1   10/2013
(Continued)

OTHER PUBLICATIONS

International Preliminary Report on Patentability received for PCT Application No. PCT/GB2017/053554, dated Jun. 20, 2019. 7 pages.
(Continued)

*Primary Examiner* — Isam A Alsomiri
*Assistant Examiner* — Abdallah Abulaban
(74) *Attorney, Agent, or Firm* — Finch & Maloney PLLC

(57) ABSTRACT

A data link (101) for a MIMO communication system (100) comprises a first transceiver device (106A) comprising a body (109A) having a transducer mounting surface near or at which is mounted a plurality of first transducers (107A-107D) configured to, in use, receive and convert a plurality of electrical waveforms to a respective plurality of acoustic signals. A first bonding layer (120A) bonds a barrier mounting surface of the body of the first transceiver device to a barrier (103). The data link further comprises a second transceiver device (106B) comprising a body (109B) and a plurality of second transducers (107'A-107'D) configured to
(Continued)

receive and convert the plurality of acoustic signals transmitted through the barrier to a respective plurality of electrical waveforms. A second bonding layer (120B) bonds a barrier mounting surface of the body of the second transceiver to the barrier.

20 Claims, 8 Drawing Sheets

(51) Int. Cl.
| | |
|---|---|
| G01N 29/28 | (2006.01) |
| G01S 7/521 | (2006.01) |
| G10K 11/00 | (2006.01) |
| G10K 11/02 | (2006.01) |
| H04B 11/00 | (2006.01) |
| H04B 1/40 | (2015.01) |
| H04L 27/00 | (2006.01) |
| H04R 17/00 | (2006.01) |

(52) U.S. Cl.
CPC .......... *G01S 7/521* (2013.01); *G10K 11/002* (2013.01); *G10K 11/02* (2013.01); *H04B 1/40* (2013.01); *H04B 11/00* (2013.01); *H04L 27/0002* (2013.01); *H04R 17/00* (2013.01); *H10N 30/00* (2023.02); *B06B 2201/55* (2013.01); *G01N 2291/0231* (2013.01)

(56) References Cited

U.S. PATENT DOCUMENTS

| | | | |
|---|---|---|---|
| 8,063,473 B1* | 11/2011 | Thai | G02B 6/4201 |
| | | | 257/730 |
| 9,331,879 B2 | 5/2016 | Saulnier et al. | |
| 9,503,201 B2* | 11/2016 | Saulnier | H04R 31/00 |
| 2014/0016558 A1* | 1/2014 | Lawry | H04L 5/0046 |
| | | | 370/328 |
| 2016/0118572 A1* | 4/2016 | Lukacs | H01L 41/08 |
| | | | 367/140 |

FOREIGN PATENT DOCUMENTS

| | | | | |
|---|---|---|---|---|
| WO | 2014066038 A1 | | 5/2014 | |
| WO | WO-2016120460 A1 * | | 8/2016 | ............ B32B 15/04 |
| WO | 2018104702 A1 | | 6/2018 | |

OTHER PUBLICATIONS

International Search Report and Written Opinion received for PCT Application No. PCT/GB2017/053554, dated Feb. 16, 2018. 8 pages.

GB Search Report under Section 17(5) received for GB Application No. 1620851.4 dated May 11, 2017. 3 pages.

* cited by examiner

MIMO COMMUNICATION SYSTEM AND DATA LINK

FIELD OF THE INVENTION

The present invention relates to acoustic Multiple Inputs Multiple Outputs (MIMO) communication systems and a data link for MIMO communication systems.

BACKGROUND

Acoustic signal transmission across a barrier for any realistic deployable ultrasonic communication system will normally be characterised by high levels of signal multipath. Such multipath is caused by reflections off intermediate interfaces, such as any physical interface between two different media of different acoustic impedance in the communications channel. Any adhesive bond between such interfaces will typically be highly reflective.

Adhesive bonds between most structural elements in an ultrasonic communications system will by necessity be acoustically thick; in part to avoid bond delamination caused by differential shear stresses during thermal cycling, and also to reduce the impact of particulate contamination on the thickness of the bond. Consequently, high fidelity analogue signals cannot be transmitted through a practical ultrasonic acoustic data link without the ghosting that is caused by multipath interference signals from bonds that form intermediate physical interfaces.

For example, two plates of NQ1 steel can be bonded together with the 2 part epoxy resin MasterBond EP30 such that the final bond line thickness is 10 µm. The predicted reflection of a longitudinal polarised acoustic wave incident at normal incidence on the bond layer would be ~94.5% at 30 MHz, and 98.5% at 100 MHz. Therefore, 100% acoustic transmission though the bond line, and therefore zero reflection off the bond, is not possible unless the adhesive bond is made extremely thin, or alternatively, is an odd integer multiple of ¼ acoustic wavelengths thick. For instance, to reduce the bond reflectivity to less than 1 for a longitudinal polarised acoustic wave of 100 MHz would require the bond line to be less than 7 nm thick. This is equivalent to $\frac{1}{2350}$ $\wedge$ thick at 100 MHz. Such thin bond layers are not realistic to achieve, particularly outside a cleanroom environment, and the resulting bond line would be extremely vulnerable to temperature induced delamination. Therefore, a digital signal coding system tolerant of multipath signal interference is required. One such known coding scheme is COFDM (Coded Orthogonal Frequency Division Multiplex).

Data in COFDM is encoded as an N dimensional vector array of 'sub-symbols', each made up of a unique combination of amplitude and phase, where N is an integer. Each sub-symbol in this vector array is used to modulate a corresponding array of sinusoidal frequency tones $f_0$ to $f_{N-1}$ distributed at regular frequency intervals. The array of modulated frequency tones is then converted by an N point Inverse Fast Fourier Transform (IFFT) into a time domain waveform of total duration r given by the inverse of the frequency spacing between adjacent tones $f_{0i}$ and $f_{i+1}$. The IFFT calculated time domain waveform is then further modified by appending onto the front of this waveform an exact copy of the rear of the same time domain waveform. The resulting composite time domain waveform is then broadcast by the transmitter across the signal channel to the receiver.

A benefit of COFDM is that it simplifies dramatically the problem of channel equalisation in a transmission environment characterised by strong multipath interference that varies rapidly with frequency. Each discrete tone occupies such a narrow frequency bandwidth that the response of the channel over the bandwidth of any given tone is normally essentially flat.

The length of COFDM symbols required for an acoustic application will generally be much longer than for a short range electromagnetic domain application, such as home WiFi™. For example, the Guard Interval for home WiFi™ is set equal to either 400 ns or 800 ns by the IEEE802.11 standard, which is acceptable because reverberation times for the EM signal multipath are short lived for any short range application. By comparison, acoustic multipath signals can reverberate for much longer due to the comparatively low speed of sound. Consequently, longer Guard Intervals are essential, typically 5 µs at least and at low frequencies of ~1 MHz where acoustic attenuation can be low, potentially in excess of 800 µs. This limits the selection of possible COTS signal modulation schemes using off the shelf components.

An alternative COTS standard is LTE technology, a 4G wireless mobile protocol, and its successor Advanced LTE. These standards support much wider frequency bandwidths and they also support much longer Guard Intervals than the IEEE802.11 standard. The LTE standard supports either Guard periods of 5.2083 µs, for the First symbol in a data frame, and then 4.6875 µs for subsequent symbols in the frame; or alternatively a Guard Period of 16.6666 µs (extended). The data rate of any ultrasonic data link will be limited ultimately by the frequency dependent slope of acoustic attenuation across the link's frequency band of operation. This remains true even though the individual tones of the COFDM modulation scheme occupy a very narrow bandwidth. As a rough guide, frequency dependent losses, ignoring the impact of multipath interference effects, should be reduced to less than ~20 dB across the overall frequency band of operation. This restriction reduces the required dynamic range of the ADC's and DAC's that are used in the digital electronics to create and decode COFDM waveforms. For example, a 16-bit ADC or DAC has a nominal dynamic range of 96.3 dB, while COFDM waveforms are characterised by a very high Peak to Average Power Ratio (PAPR).

'Intrinsic' acoustic attenuation in solids is dominated by two attenuation mechanisms, both of which exhibit quadratic scaling with frequency in units of dB/cm. The intrinsic loss mechanisms are the thermoelastic mechanism, which affects only longitudinal acoustic waves, and the Akhieser mechanism, which affects both longitudinal and shear waves. Losses due to scattering off impurities and defects etc. are often termed 'extrinsic' losses. Extrinsic acoustic attenuation typically exhibits a lower power law dependence on frequency, albeit from a much higher base level. Viscoelastic materials, such as many plastics, often exhibit a linear dependence with frequency.

One consequence of acoustic attenuation in a communication channel where multipath arises from echoing between opposite surfaces is that the signal multipath may be progressively suppressed as the level of bulk attenuation increases. This can be a problem in a MIMO-OFDM system since it requires a rich multipath environment in order to operate effectively.

Most COTS COFDM and MIMO-COFDM modem systems broadcast over a frequency bands that are multiples of either 10 MHz or 20 MHz, namely: 10 MHz, 20 MHz, 40 MHz, 80 MHz and 160 MHz. The DVB-T standard used for broadcasting television is an exception with allocated channel bandwidths of 8 MHz. The LTE standard supports in addition to a 20 MHz bandwidth, smaller frequency bandwidths of 1.4 MHz, 3 MHz, 5 MHz, 10 MHz and 15 MHz for backward compatibility purposes.

Traditionally, multi-path signals have been seen as a complication to be avoided due to signal interference issues between different times of flight signals that arise from reflections off different path trajectories. MIMO, however, deliberately exploits the presence of signal multipath to offer an improved communication capability.

The benefits offered by MIMO techniques depend on the signal to noise performance of the signal channel. Consider a communications channel that is characterised by poor signal to noise. Destructive signal interference between different 'time of flight' signals is likely to yield signal fade out at specific frequencies. This effect for a Single Input Single Output (SISO) communication system, with one antenna at each end of the communications link, can lead to an unacceptably high Bit Error Rates (BER) if too many frequency tones are affected. In this situation, one or more arrays can support signal channel diversity between the sender and the receiver. A single array can be located on either the transmitter or the receiver side of the communications channel to achieve the same diversity performance. Better still is to have both a transmitter array and a receiver array which further increases signal channel diversity. The extra communication paths provided by the arrays are probabilistically more resilient to simultaneous signal fade out at any given frequency. Expressed another way, it is less likely that all possible pairs of Tx and Rx antennae will be simultaneously affected by signal fade out at any given transmission frequency. However, this benefit does require the separation between individual antennae in at least one of the arrays, transmit or receive, to be at least larger than 0.5 wavelengths apart. Better still, the individual antennae in each array should be spaced at least larger than 0.5 wavelengths apart.

Alternatively, in a communications channel characterised by good signal to noise, destructive interference between different times of flight signals is no longer a major problem for a COFDM based coding scheme. Now the two arrays can be used to massively boost the signal transmission data rate over that achievable with a SISO communications geometry. Transmission data rates of a MIMO configuration can be increased by up to a factor equal to the smaller number 'N' or 'M' of antenna at the transmit or receive ends of the system.

To achieve an increased data rate using a MIMO configuration requires a coding scheme that allows spatially orthogonal data streams to be transmitted between the two arrays. One example is MIMO-OFDM, where OFDM again stands for Orthogonal Frequency Division Multiplex.

MIMO-OFDM is an extension of the OFDM concept whereby independent OFDM data streams are transmitted by each of the transmit antennae. This array of data streams is in turn detected by all of the receive antennae of the receiver array. The mathematical relationship between the set of signals $S_{T\,j}$ transmitted by the elements j of the transmit array, and the signals $S_{R\,i}$ received by element i of the receiver arrays, are given by:

$$S_{R\,i} = H_{i\,j} * S_{T\,j} + N_i$$

where:

$H_{i\,j}$ are the communications channel coefficients representing the mapping of signals transmitted to those received.

$N_i$ is the noise signal associated with the electrical output from receiver transducer i (in the above equation and elsewhere in this application, the Einstein convention of summing over repeated subscripts is observed).

In matrix form for a 4×4 array, the same equation for the received signals is given by:

$$\begin{bmatrix} S_{R1} \\ S_{R2} \\ S_{R3} \\ S_{R4} \end{bmatrix} = \begin{bmatrix} H_{11}H_{12}H_{13}H_{14} \\ H_{21}H_{22}H_{23}H_{24} \\ H_{31}H_{32}H_{33}H_{34} \\ H_{41}H_{42}H_{43}H_{44} \end{bmatrix} \begin{bmatrix} S_{T1} \\ S_{T2} \\ S_{T3} \\ S_{T4} \end{bmatrix} + \begin{bmatrix} N_1 \\ N_2 \\ N_3 \\ N_4 \end{bmatrix}$$

If the communications channel coefficients $H_{i,j}$ are known, then a set of independent transmitted OFDM data streams can be extracted by multiplying the received signals by the inverse matrix $H^{-1}$, provided the noise signal level is sufficiently small for the FEC of the coding scheme used to correct any sub-symbol detection errors.

Knowledge of the communications channel coefficients $H_{i,j}$ can be extracted by transmitting at intervals known pilot signals which are then received and used to determine the matrix H. The pilot symbols themselves should be orthogonal in either: time, frequency or code. If the channel is slowly varying with time, then a favourable scheme is to transmit entire blocks of known pilot signals on every frequency tone of the OFDM modulation scheme. In a full duplex communications system which supports 2 way communications, repeat transmission of such pilot symbols can be triggered when the bit error rates observed at the receiver prior to forward error correction start to deteriorate; note this deterioration in the pre-corrected bit error rate will happen normally well in advance of the Forward Error Correction algorithms starting to fail. Alternatively, the block transmission of pilot symbols should be repeated at regular intervals to maintain communications lock.

In a system where the channel varies rapidly with time, for example, where there is movement by either the transmitter or receiver arrays such that the communications channel properties change, a different pilot signal approach must be used. This time pilot signals are continuously broadcast with every Symbol on a small subset of the total of available OFDM frequency tones. An interpolation methodology is then used to extract the signal channel coefficients $H_{i,j}$ for the frequency tones that carry data. The pilot signals may be distributed at either regular intervals or alternatively scattered across the comb of frequency tones used by the OFDM scheme.

Spatially orthogonal data streams can only be achieved when adjacent antenna in both the transmitter and the receiver arrays are separated by at least 0.5 acoustic wavelengths in the communication medium. It is not practical to achieve this separation for more than 2 antennae on a conventional mobile phone handset operating at 2.5 GHz. A further requirement for spatially orthogonal data streams is that acoustic communications channel must exhibit a complex and rich multipath of arriving signals. There must also be low signal correlation between the received signals; otherwise the separate data streams cannot be fully independent and the supportable data rate falls. Signal correlation increases as the phase differences between different propagation paths become smaller. Signal correlation tends to increase as the separation between the transmitter elements and the receiver elements increase; particularly in strong line of sight conditions. Signal correlation however falls as the separation between adjacent transmitter elements is increased in wavelength terms. Scattering elements close to the receiver antennae array if present will also reduce signal correlation at all ranges between the transmitter and receiver arrays.

In the acoustic domain, acoustic MIMO is known, but it is much less well developed technologically. Acoustic MIMO has been described, for example, by Ashdown, J. D.; Saulnier, G. J.; Lawry, T. J.; Wilt K. R.; Scarton, H. A.; 'High-Rate Ultrasonic Communication Through Metallic Barriers Using MIMO-OFDM Techniques' MILCOM 2012-2012 IEEE Military Communications Conference, IEEE 978-1-4673-Mar.12, 2013, pp 1-6. This known system used transducers that operate at very low centre frequencies of ~4 MHz and have a relatively small available frequency bandwidth. Also, the transducers were bonded directly to the barrier, which therefore yielded a much less rich multipath environment for supporting MIMO communications, and it could be argued that the geometry was like a set of separate acoustic 'wires' each supporting a separate data stream. The physical footprint of the data link was also relatively large and the transducers appear to operate over greater than an octave frequency bandwidth, i.e. $\Delta f > 0.66\ f_c$, which has negative implications for the required linearity of their electronics.

Embodiments of the present invention are intended to address at least some of the above technical problems.

BRIEF DESCRIPTION

Embodiments of the solution disclosed herein can provide a practical implementation geometry for realising very high data rate acoustic MIMO through either a solid barrier, or a fluid containing barrier, without requiring physical penetration. The thickness limit on the barrier is usually limited principally by the following parameters: acoustic spreading losses within the barrier; acoustic attenuation within the barrier, both absolute and as a function of frequency; and the available linear dynamic range of both the drive and receive electronics. Consequently a wide range of possible barrier thicknesses can be supported depending on the barrier materials employed, and the system's electronic design. Ultimately the maximum thickness is limited by the signal to noise ratio at the input electronics of the receiver array.

Embodiments of the solution disclosed herein can provide a practical implementation geometry for realising very high data rate acoustic MIMO through either a solid barrier, or a fluid containing barrier. The maximum barrier thickness through which data can be transmitted successfully is determined by the required Bit Error Rate (BER) performance for the communication system. Before Forward Error Correction (FEC), the BER might be as bad as $5 \times 10^{-2}$. Typically, after Forward Error Correction (FEC), a BER of better than $10^{-7}$, is normally sought. The BER for its part will be a function of both the Forward Error Correction algorithms used either individually or collectively (e.g. a combination of Viterbi FEC and a Reed Solomon FEC may be used), and the complexity of the signal modulation scheme. Ultimately the Signal to Noise Ratio (SNR) for each COFDM frequency tone at the electronics inputs of the individual elements of the receiver array will limit the maximum barrier thickness that can be supported.

Parameters which affect the signal to noise ratio performance at the receiver include: acoustic attenuation within the barrier as a function of frequency; acoustic spreading losses within the barrier (high acoustic spreading losses arise as a consequence of high acoustic diffraction of the waves launched by the transmitter. Consequently higher spreading yields less sound that actually falls on the input acoustic aperture of the receiver chip); the available linear dynamic range of both the drive and receive electronics; and finally the signal modulation scheme employed (higher order signal modulation schemes, such as for example 256QAM, may be less tolerant of signal to noise than a simpler modulation schemes, such as BPSK. Likewise increasing the number of signal transmitters and receivers in an attempt to boost the data rate may require a higher signal to noise performance, and thus may reduce the thickness of the barrier through which data can be transmitted).

For the specific case of ballistic grade aluminium which has attenuation coefficient of $1.05 \times 10^{-14}$ Nepers/m, a 27 mm thick barrier will yield an attenuation slope of 20 dB between 80 MHz and 120 MHz.

The overall linear dynamic range of the system electronics can be increased by applying a pre-emphasis filter on the relative amplitude of the frequency tones making up the COFDM waveform. The objective is to pre-weight the amplitude of the frequency tones to compensate at least in part for the subsequent frequency dependent loss of signals transmitted across the barrier. One approach is applicable within an OFDM Modulation whereby the relative amplitude of the COFDM constellations applied to the array of frequency tones is progressively increased as the tone frequency is increased.

Such a pre-emphasis filter may also be beneficial by reducing the required dynamic range $Z_{Wave}$ bits for the OFDM waveform; this is because the statistical peak to mean amplitude of the OFDM waveform will be reduced (OFDM waveforms are characterised by very high peak amplitude to average amplitude ratios). For certain QAM modulation schemes, applying a $\sim V_{Con}$ bit slope in the relative amplitude of constellations over the frequency band of operation may yield a $\sim \Delta Z_{wave}$ bit increase in the peak to mean of the waveform. However, this pre-emphasis filter may reduce the receiver's required signal amplitude resolution by $\sim (V_{Con} - \Delta Z_{wave})$ bits. This improvement assumes the bit dynamic range of acoustic attenuation in the barrier exceeds $V_{Con} - \Delta Z_{wave}$.

The primary contributors to the maximum dynamic range for a MIMO acoustic data link transmitter electronics may be considered as follows. The three main system blocks of such a system may consist of a MIMO Digital Orthogonal Data Stream block, an OFDM Modulator, and a Transmitter Back End. The MIMO Digital Orthogonal Data Stream block may be purely digital and effectively noiseless. The OFDM Modulator may be purely digital. However, the OFDM time domain waveform created by its IFFT may suffer from quantisation noise created by the finite bit precision of the IFFT algorithm. The Transmitter Back-End may be predominately analogue and is the main source of transmit signal noise. The impact of IFFT quantisation noise can be made insignificant if the bit precision of the IFFT algorithm is at least 3 bits larger than dynamic range for the OFDM waveform of $Z_{Wave}$ bits. This OFDM waveform in turn desirably has a smaller overall dynamic range smaller than the Bit resolution of the DAC's, typically ~16 bits, maximum. The Transmitter Back-End of the data link is partly/largely analogue in nature and it is the main source of signal noise on the transmitter side which in turn determines the available dynamic range of the transmitter. The remaining two main system blocks manipulate purely digital signals.

Frequency dependent transmission losses across the MIMO acoustic link may be dominated by acoustic attenuation losses in the barrier which exhibit a typically frequency squared dependence for signal transmission loss expressed in dB/cm. Some of issues that affect the maximum barrier thickness through which MIMO communications can be supported are presented below:

Transmit Side Factors:

Noise limit of transmitting Amplifiers (Noise limits the maximum signal amplitude resolution (≡W bit) that can be supported).

Dynamic range of the transmitter side DAC (Digital to Analogue Converter). If the MIMO waveform needs X bit amplitude resolution, and the DAC has Y bit resolution (Y>X), the frequency tones on the COFDM protocol can be amplitude weighted as a function of frequency over the total bandwidth by (Y−X) bits. This pre-transmit signal equalisation operation can reduce the required dynamic range on the receiver side of the communications link.

The comb of COFDM frequency tones may be partitioned into frequency blocks that are each differentially amplified by the transmit electronics. The maximum differential amplification across the total frequency band of operation is limited to Y−X bits, but with the limit Y<(W+U) where U is the final signal to noise ratio in bits needed to support MIMO communication. The differentially amplified signals may be passed through an IFFT (Inverse Fast Fourier Transform) chip to create the time domain waveform that is launched by the transmitter transducer.

Receive Side Factors:

Input signal noise. The transducer produces an analogue voltage signal when excited by an incident acoustic waves falling within its angular acceptance aperture. This voltage is applied to an input resistance $R_i$ which will generate a thermal noise RMS voltage of $(4k_B T R_i \Delta f)^2$, where $k_B$ is the Boltzsmann's constant, T is the temperature in Kelvin, and $\Delta f$ is the bandwidth of the signal channel. The ultimate signal noise limit would be set by shot noise statistics given by $n^{1/2}/n$, where n is the number of charge carriers excited at the input impedance of the receiver circuit by the incoming acoustic wave on the transducer.

Dynamic range of the transmitter side ADC (Analogue to Digital Converter). This ADC digitises this waveform which is then passed through a Fast Fourier Transform to extract the COFDM frequency tones broadcast. If the MIMO waveform has a required X bit amplitude resolution, and the ADC has Z bit resolution (Z>X), then the permissible frequency dependent loss slope due to all sources (principally acoustic attenuation) cannot exceed [(Z−X)+(Y−X)] bits. Here (Y−X) is the frequency bias slope allied by the transmitter electronics. Again the signal to noise ratios for all frequency tones must exceed the U bits signal to noise ratio needed to support MIMO communications.

Embodiments can provide more reliable data transfer in environments characterised by signal reverberations that are created by reflections off intermediate objects between the sender and receiver. Embodiments can provide a major increase in the data transfer rate for a given frequency bandwidth compared to that achievable by a traditional system comprises one transmit antenna and one receive antenna. Embodiments typically involve bonding an array of high frequency transducers onto a body/block of dielectric material that, in turn, is mounted on the barrier. Embodiments can use two low acoustic loss blocks to create a complex signal transmission multipath across the data link. These blocks prevent the multipath suppression that would occur if the transducers were bonded directly to a barrier subject to high acoustic attenuation.

According to one aspect of the present invention there is provided a data link for a MIMO communication system comprising:

a first transceiver device comprising a body having a transducer mounting surface near or at which is mounted a plurality of first transducers configured to, in use, receive and convert a plurality of electrical waveforms to a respective plurality of acoustic signals;

a first bonding layer configured to, in use, bond a barrier mounting surface of the body of the first transceiver device opposite its transducer mounting surface to a barrier through which the plurality of acoustic signals output by the first transceiver device is transmitted;

a second transceiver device comprising a body having a transducer mounting surface near or at which is mounted a plurality of second transducers configured to, in use, receive and convert the plurality of acoustic signals transmitted through the barrier to a respective plurality of electrical waveforms, and a second bonding layer configured to, in use, bond a barrier mounting surface of the body of the second transceiver device opposite to its transducer mounting surface to the barrier.

The body of the first and/or the second transceiver device may comprise a material providing high acoustic velocity and/or low acoustic attenuation/loss, e.g. sapphire, or single crystal sapphire, YAG or fused silica.

In use, the body of the first transceiver device and the body of the second transceiver device function as reverberation chambers for the acoustic signals.

A thickness of the first bonding layer and/or the second bonding layer is typically determined as a function of a centre frequency of a channel of the MIMO signal, and also a power averaged angle of incidence of a total ensemble of multipath signals generated in the MIMO channel. A thickness of the adhesive bond layer may be adjusted so that periodic transmission maxima occur outside a frequency bandwidth $\Delta f$ of the acoustic MIMO channel. This can reduce the adverse impact on the supportable data rate caused by direct line of sight signal dominance when the transmission of the adhesive bond has low reflectivity.

For the specific case of a MIMO signal channel operating at a centre frequency of 100 MHz, a Masterbond Inc EP30 adhesive bond (a two-part epoxy resin) will have periodic transmission minima at 8.2 μm thickness intervals for sound incident at normal incidence starting at ~4.15 μm and then ~12.35 μm, etc, thicknesses values. Generally, thickness intervals may start at a value within a range of about 4.0 μm to about 4.30 μm, and then within a range of about 12.2 μm to about 12.5 μm. Note that if a different centre frequency is employed, then the above thickness values/ranges will scale accordingly, by a scaling factor given by: freq(new)/freq (100 MHz), where freq(new) is the new/different frequency and freq(100 MHz) is the 100 Mhz frequency to which the above thickness values relate. The 12.35 μm thickness is arguably better because the frequency range over which reflectivity of the bond exceeds ~90% will be for most metallic substrates greater than 40 MHz centred on 100 MHz. There are corresponding periodic transmission maxima at adhesive bond thicknesses of ~0 μm, ~8.2 μm, etc. In some embodiments, the first and/or the second bonding layer may have a reflectivity of between around 18%-98% as a function of a thickness of the first and/or the second layer.

The first bonding layer and/or the second bonding layer may comprise a low acoustic loss layer (e.g. acoustically thin) and/or a low acoustic loss material, and/or may be thick, and/or may be highly acoustically reflective, e.g. up to around 98%. The level of reflectivity is a function of angle of incidence and bond line thickness. If two identical media are bonded together then the reflectivity of the bond layer will be 100% for sound incident at the correct angle of incidence to yield destructive interference for transmitted sound waves. This effect is analogous to an optical Fabry Perot. If the two media bonded together have very different acoustic impedances, then this reduces the maximum reflectivity of the bond layer.

The first bonding layer and/or the second bonding layer may comprise a resin material, e.g. EP30, doped with spacer material, e.g. micro-pearl/polymer spheres. Alternatively, first bonding layer and/or the second bonding layer may comprise an acoustic coupling gel, fluid or a solder joint.

The body of the first and/or the second transceiver device may be a block or cuboid in shape. At least one wall surface may extend between the transducer mounting surface and the barrier mounting surface. At least one dimension of the transducer mounting surface may be relatively smaller than at least one corresponding dimension of the at least one wall surface. In use, this means that reflections off the wall surfaces contribute more strongly to the multipath signal environment provided by the body. It may be beneficial to reduce the size of the transducer mounting surface so that multipath reflections off the side walls of the body contribute more strongly to the overall multipath signal environment.

A live electrode of each of the plurality of first (and second) transducers may be rectangular in shape, or may be elliptical or diamond in shape. A shortest dimension of the rectangular (or elliptical or diamond) shape may be parallel to a main axis of the plurality of transducers. This can ensure that the highest far field diffraction occurs along the axis of the transducers to provide a particularly rich multipath signal channel along this axis.

In some embodiments positions of the plurality of first transducers is non-periodic and non-symmetric with respect to positions of the plurality of second transducers.

According to another aspect of the present invention there is provided a MIMO communication system comprising:

a first MIMO modem configured to, in use, receive and convert an input signal to output the plurality of electrical waveforms to the first transceiver device;

a second MIMO modem configured to, in use, receive and convert the plurality of electrical waveforms output by the second transceiver device to produce an output signal, and a MIMO data link substantially as described herein.

The system may further comprise:

a first electrical impedance matching device configured to match impedances of the plurality of electrical waveforms output by the first MIMO modem to match impedances of the plurality of first transducers, and/or a second electrical impedance matching device configured to match impedances of the plurality of electrical waveforms output by the plurality of second transducers to match impedances of the second MIMO modem.

The plurality of electrical waveforms may represent a respective plurality of data streams based on the input signal. Each of the data streams can comprise a plurality of packets.

According to another aspect of the present invention there is provided a method of constructing a MIMO communication system and/or components of a MIMO data link substantially as described herein.

The method may comprise mounting a plurality of transducers to a transducer mounting surface of a body, e.g. a body of sapphire, or single crystal sapphire.

The plurality of transducers may be mounted on the transducer mounting surface by a vacuum cold weld process.

In some embodiments the plurality of transducers are arranged as a square or rectangular array. The method may further comprise cutting the body mounted with the plurality of transducers into separate transceiver devices, each including an array of transducers.

The method may further comprise bonding a barrier mounting surface of the body opposite its transducer mounting surface to a barrier.

In an aspect, the invention may provide an electroacoustic transducer, comprising a piezoelectric part comprising a piezoelectric material having a first acoustical impedance; a substrate part comprising a material having a second acoustical impedance; an intermediate part comprising a material having a third acoustical impedance and at least partially sandwiched between the piezoelectric part and the substrate part for acoustical communication therewith; wherein the first acoustical impedance and the second acoustical impedance each has a respective value within a range of values for which the value of third acoustical impedance is an extreme limit. The acoustical thickness of the piezoelectric part may be within the range $0.4\Lambda$ to $0.6\Lambda$ where $\Lambda$ is an acoustical wavelength in the material of the piezoelectric part; and, the value of third acoustical impedance may be a lower limit to the range of values at that acoustical wavelength ($\Lambda$). The wavelength and/or impedance may be in terms of acoustical signals of 100 MHz frequency. The value of the first acoustical impedance may be less than the value of the second acoustical impedance. The acoustical thickness of the intermediate part sandwiched between the piezoelectric part and the substrate part may be less than $0.2\Lambda$ where $\Lambda$ is an acoustical wavelength in the material of the intermediate part.

BRIEF DESCRIPTION OF THE FIGURES

For a better understanding of the invention, and to show how embodiments of the same may be carried into effect, reference will now be made, by way of example, to the accompanying diagrammatic drawings in which.

DETAILED DESCRIPTION

Figure 1:
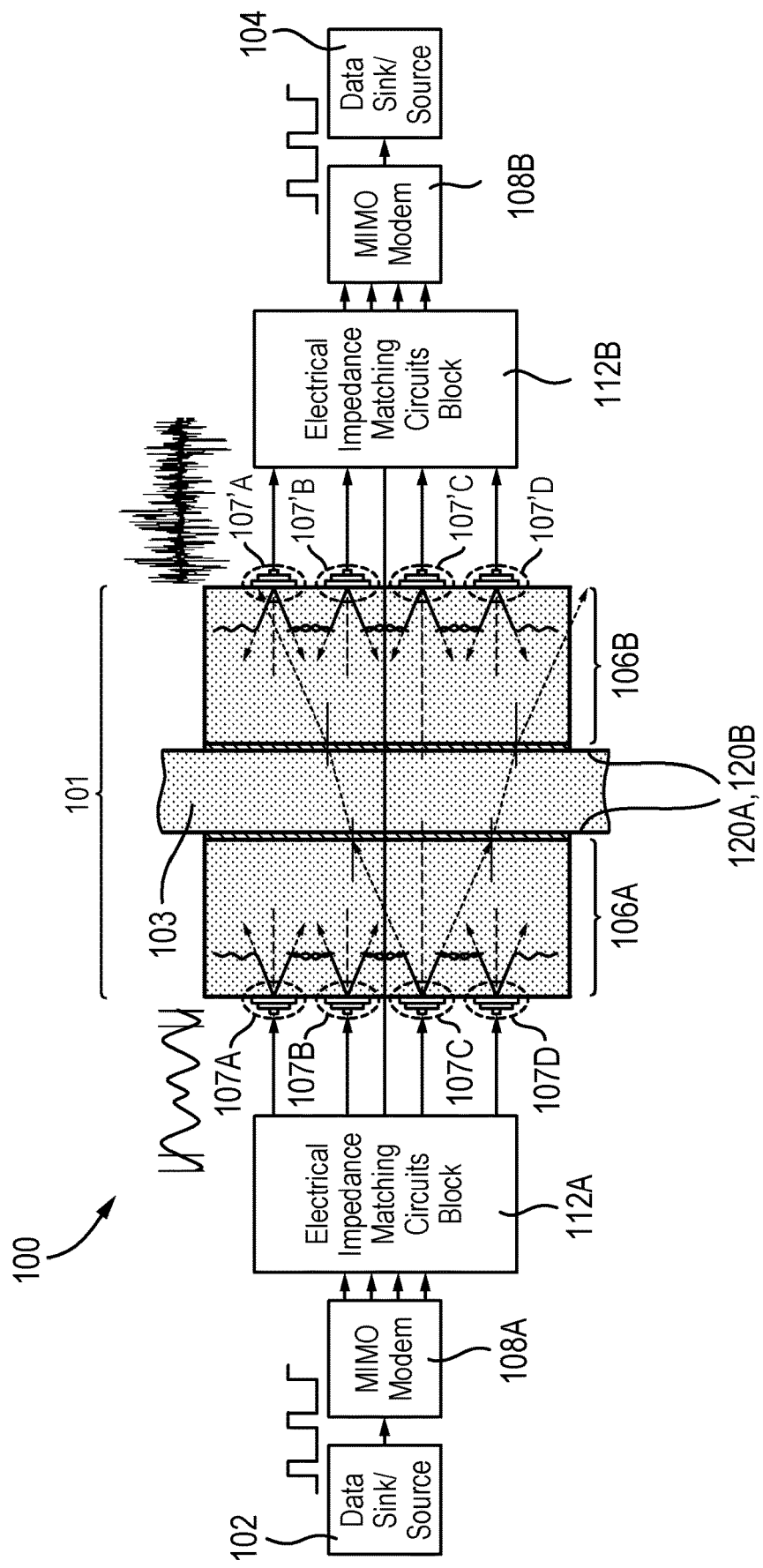
FIG. 1 is a schematic block diagram of an acoustic MIMO system according to a first example embodiment.

FIG. 1 is a block diagram of an example acoustic MIMO communication system 100. The diagram shows the top level blocks that support the transmission of data from a data source 102 on the left-hand side, via an acoustic MIMO data link 101, to a data sink 104 on the right-hand side. The example system is intrinsically symmetrical (although in practice there may be lateral offsetting of some components) and could alternatively be used to transmit data from right to left, with the roles of the source 102 and sink 104 being reversed. The example embodiment is intended to provide high speed digital communications through a thin, e.g. 10 mm thick, wall/barrier 103 of ballistic grade aluminium over the frequency range 80 MHz to 120 MHz. Using an LTE based signal modulation scheme the embodiment can be capable of supporting data transfer rates of greater than 300 Mbps.

Simultaneous full duplex data transmission cannot be supported over the same frequency band of operation in the example system 100. This is because the legitimate received signals on any given end of the link would be swamped by the many stronger signals transmitted on the same side of the link. Full duplex operation using a common MIMO transceiver device/chip 106A, 106B could, however, be supported if the total available frequency bandwidth was partitioned into two blocks, with one frequency block used to transmit in one direction, and the other used to transmit in the opposite direction. The frequency partition could be set unequal in bandwidth if the data transmission rate required in one direction was normally much higher than in the reverse direction. Some of the more recent OFDM based standards are able to partition the available bandwidth dynamically to support variable data flows in each direction.

In use, data from the data source 102 is accumulated in a first MIMO modem 108A, which constructs frames of data consisting of a serial sequence of many symbols partitioned into 4 separate data streams. Each of these data streams can be configured to be independent, thus allowing the same frequency bandwidth to support a much larger data transmission rate. The symbols of each data stream are turned into electrical time-domain waveforms which are made up of an array of frequency tones occupying the frequency bandwidth Δf of the system. This frequency bandwidth will be fundamentally limited to that supportable by transducers in a pair of MIMO transceiver devices/chips 106A, 106B included in the acoustic MIMO data link 101. In the example embodiment 100 this available frequency bandwidth is 40 MHz. The skilled person will appreciate that embodiments of the communication system can be modified to work with any suitable MIMO protocol.

The output impedance of the four outputs of the first MIMO modem 108A will, in general, not be electrically matched to the input impedance of the array of transducers in the acoustic MIMO data link 101. Electrical impedance matching is achieved using a first electrical impedance matching circuits block 112A associated with the first modem 108A. This block contains 4 nominally identical electrical impedance matching circuits, one for each transducer of a first MIMO transceiver device/chip 106A.

The acoustic MIMO data link 101 in the example embodiment comprises the first MIMO transceiver device/chip 106A and a second MIMO transceiver device/chip 106B. Each of the MIMO devices/chips 106A, 106B comprises a body 109A, 109B, each of which is formed of a block of single crystal sapphire in the example embodiment. The body/block of each MIMO device/chip has an array of 4 identical transducers (labelled 107A-107D for device 106A and 107'A-107'D for device 106B). The transducers may be mounted onto the body by being bonded onto the crystalline C-axis face using a vacuum cold weld bond of gold, but other metals and mounting/bonding methods are possible. It will also be appreciated that the positioning of the transducers can vary. The size of the blocks is not a critical parameter, nor do they have to be rectangular and other shapes are possible. The transducer mounting surface of the block does not need to be parallel to the surface of the block that is, in use, mounted on the barrier 103. It is, however, beneficial to reduce the size of the transducer mounting surface so that multipath reflections off the side walls of the chips contribute more strongly to the overall multipath signal environment. For convenience, the height of each sapphire block is 8 mm, and its transducer mounting surface is 11 mm long by 5.8 mm wide. These dimensions conveniently support the parallel processing of 28 device blanks as illustrated by the photograph image of FIG. 5 (see below), which shows a 7 by 4 array of partly processed devices mounted in a polishing jig used to thin the transducers to their final thickness.

Sapphire is a particularly suitable material for the MIMO device chips 106A, 106B because the speed of sound along the C-axis of sapphire is unusually high at ~11,000 m/s for longitudinal waves. This for the same acoustic transit loss that will reduce the reverberation time for multipath signals within each MIMO device chip and so reduce the required Guard Interval for any MIMO-COFD coding scheme. The high velocity also means the length of the chip can be made shorter than with an alternative material to achieve the same level of acoustic overlap over the Rx transducer array; note the acoustic wavelength in sapphire at a given frequency is much longer than other materials due to its the higher speed of sound. Thus, acoustic diffraction for a given electrode size is higher. This means that required Guard period can be further reduced compared to an alternative material. The benefit of reducing the Guard period is that shorter Symbol duration's τ can be supported, which allows the same data rate to be supported with fewer frequency tones. This in turn allows the frequency band-pass filters to be made wider, and also requires smaller point number IFFT and FFT operations, albeit generated at a faster rate. This is very beneficial to the overall computation complexity because the number of numerical operations required in the digital electronics to calculate an IFFT or FFT scales at the rate of $O(N \log_2 N)$ operations (technically, O only denotes an upper bound) where N is the number of points in the IFFT or FFT.

Also, the acoustic attenuation of sapphire is very low at a frequency of ~100 MHz. This means that the body 109A, 109B of each device 106A, 106B can act as a reverberation chamber. This, coupled with the highly diffracting beams launched by each of the separate transducers, supports the creation of a complex set of multipath signals.

Sapphire is also mechanically extremely rugged. Other (single or combined) materials in place of Sapphire could be used; for instance un-doped YAG, or, for example, fused silica which has the benefit of being a very cheap material compared to single crystal sapphire. Other dielectric materials are also possible, provided they are low acoustic loss materials.

The electrical waveform emerging from each of the four electrical impedance matching circuit block 112A are applied the associated acoustic transducers 107A-107D of the first MIMO device/chip 106A. The acoustic signals produced by these transducers are then transmitted across the barrier 103 to the second MIMO data device/chip 106B.

Here, the acoustic signals are reconverted into an electrical signal of considerably greater complexity than the original Symbol waveforms that were transmitted on the input side acoustic MIMO data link 101. These received signals are then impedance matched to the input impedance of a second MIMO modem 108B using a second electrical impedance matching circuits block 112B. This electrical impedance matching block will in a symmetrical physical geometry be nominally identical to the first electrical impedance matching block 112A. The second MIMO modem 108B then decodes the received signal and transfers the data to the data sink 104.

The acoustic MIMO data link 101 in the example embodiment further comprises layers 120A, 120B that, in use, bond/mount the first 106A and second 106B MIMO devices/chips onto opposite faces of the barrier 103. The two bonding layers are nominally identical and in the example embodiment comprise the two part epoxy resin MasterBond Inc EP30 doped with 13 μm diameter polymer micro-pearl spheres at a concentration of ~2% by dry volume (although other concentrations could be used) to the epoxy resin mix. In practice, the diameter of the micro-pearl spacers may need to be adjusted to, probably, a larger diameter to accommodate compression of the spheres under adhesive curing load pressures, and also the bonding surfaces are not perfectly smooth. Suitable polymer spheres are supplied by Sekisui Chemical Co Ltd of Japan, product number SP-213. The final target thickness for the bond line is 12.35 μm in the example embodiment. Bond adhesion to the barrier is enhanced by lapping the mating bonding surfaces to a surface finish courser than 0.2 μm CLA. In an alternative embodiment an encapsulated MIMO device/chip may be clamped to a solid barrier immersed in a fluid, with the fluid medium between the encapsulated MIMO device and the barrier functioning as an acoustic coupling layer that is acoustically exactly like, for example, a bond layer.

Acoustic coupling between the first 106A and the second 106B MIMO devices and the barrier 103 can alternatively be achieved by other types of layers, e.g. acoustic coupling gel, a fluid, or a solder joint. A solder joint would require very careful selection design because most dielectric materials have a considerably smaller coefficient of thermal expansion to that of a barrier. Spacer particles, such as nickel spheres, would be needed to ensure the solder joint was thick enough to be sufficiently resilient to accommodate the CTE mismatch between the soldering temperature and actual operational temperatures, which would be much lower. Spacers may be added to the bond layers 120A, 120B to ensure a repeatable bond layer thickness, and thus reproducible reflectivity. In the case of the materials used in the example embodiment comprising an aluminium barrier with sapphire blocks bonded to it, the reflectivity of each of the bond layers varies periodically between 18% and 98%, as a function of bond thickness. Transmission peaks occur at ~8.2 μm intervals with transmission peaks at bond thicknesses calculated to occur at 4.15 μm, 12.35 μm, etc, for sound incident at normal incidence. It will be appreciated that the figures for other embodiments will differ.

Although the widest frequency response for high reflection at the bond interface occurs with a 4.15 μm thick bond line, a better choice for practical implementation is a 12.35 μm thick bond layer 120A, 120B. The thicker bond layer will be more resistant to possible bond delamination caused by thermal cycling. Even so the reflectivity of the bond layer will exceed 94.5% over the frequency range of 80 MHz to 120 MHz. In practice, the acoustic signals emitted by each transducer spread rapidly due to acoustic diffraction and so deep transmission notches would be at least partly smeared out by multipath processes.

Other adhesives instead of EP30 could be used, but the optimal thickness of the bonds would need to be fine-tuned to match the acoustic velocity of the adhesive used (the calculated velocity of longitudinal acoustic waves in EP30 adhesive is 1645 m/s derived from density and Young's modulus data).

The highly reflective acoustic bond layers 120A, 120B of the example embodiment support the creation of a reverberation chamber within each of the transceiver device chips 106A, 106B. This results in a complex set of multipath signals. To a lesser degree, further multipath may be created within the acoustically attenuating barrier 120 itself. The further multipath complexity is created by acoustic mode conversion processes that occur when the sound waves reflect off oblique surfaces in the MIMO devices 106. The end result is an acoustic data link with a rich and complex multipath character that includes a huge array of different time of flight signals. This naturally supports high data rate MIMO communications (provided the transducer electrodes are more than 0.5 acoustic wavelengths apart in each array).

Figure 2:
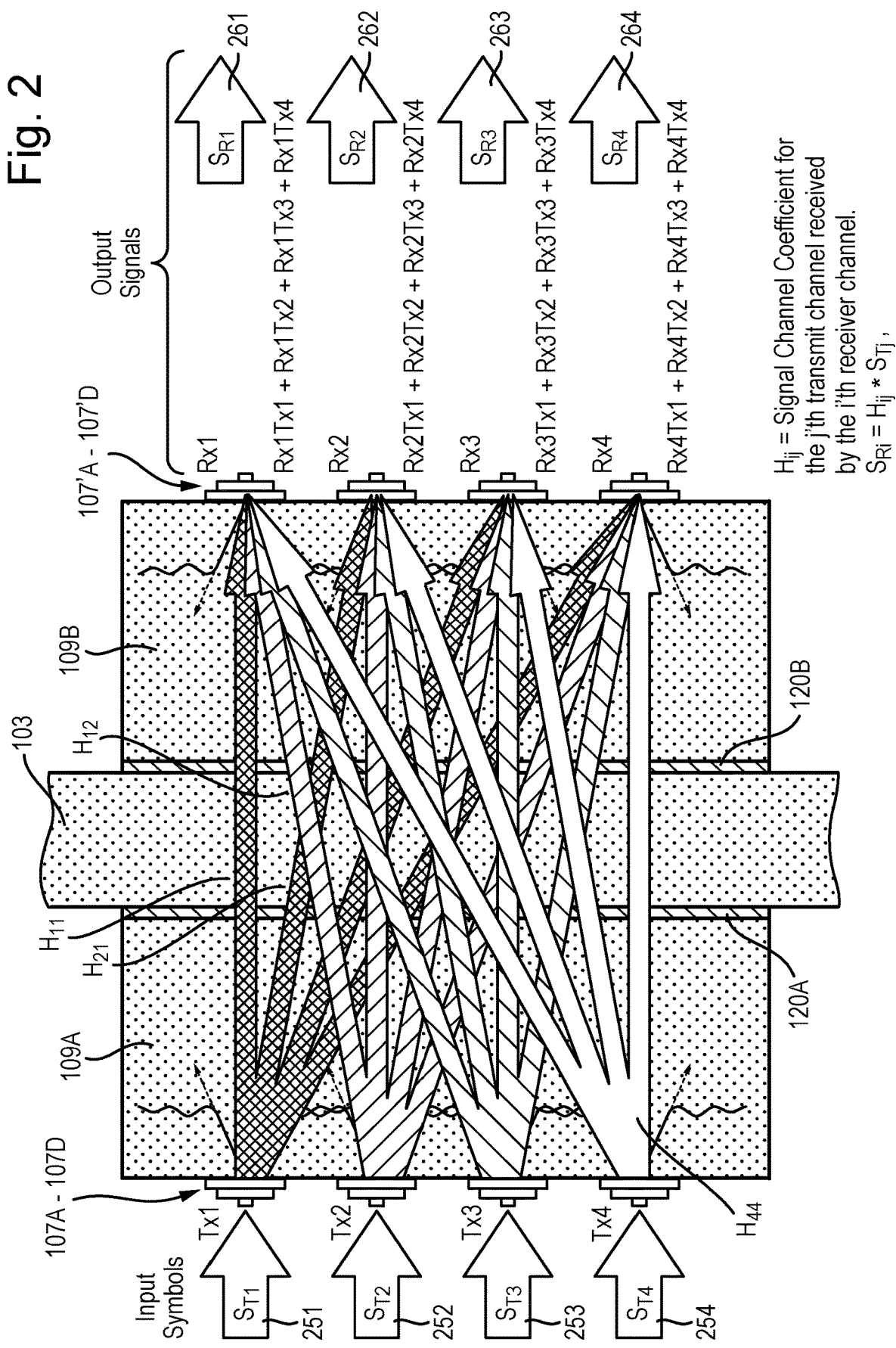
FIG. 2 is a detailed schematic diagram of an acoustic MIMO data link showing a set of possible transmit to receive communication channels for the 4×4 MIMO configuration of the embodiment of FIG. 1.

By design, every transmit transducer (107A-107B) in the example embodiment) broadcasts acoustic signals which are later received by all of the receive (107'A-107'D) transducers. This occurs through a combination of rapid angular spreading of the acoustic signal emitted by each of the launch/transmit transducers due to diffraction, and also multipath reflections within each MIMO device/chip 106A, 106B, and to a lesser degree in the barrier 103. The various arrows shown in FIG. 2 connect every launch transducer to every receive transducer. These arrows represent the signal channel coefficients $H_{i,j}$ of the data link, and the signal channel coefficients $H_{i,j}$ represents the multipath signal mapping for each launch transducer j to each receiver transducer i.

Four independent Symbols $S_{T1}$ (251), $S_{T2}$ (252), $S_{T3}$ (253) and $S_{T4}$ (254) are applied to their respective transmit Transducers 107A, 107B, 107C and 107D. Each Symbol may carry different data payloads to increase the overall data transmission rate. The received signals $S_{R1}$ (261), $S_{R2}$ (262), $S_{R3}$ (263) and $S_{R4}$ (264) will be made up of a different weighted sum of the multipath copies of the four independent Symbols originally transmitted. The relationship between the signals $S_{Rj}$ received by each Rx transducer, and the original Symbols $S_{Tj}$ launched is given by:

$$S_{R\,i}=H_{i\,j}*S_{T\,j}+N_i$$

where:

$H_{i,j}$ are the communications channel coefficients representing the mapping of the array of Symbols $S_{Tj}$ launched by the transmitting array and the signals $S_{Rj}$ received by the receiver array;

$N_i$ is the noise signal associated with the electrical output from receiver transducer i.

If the $H_{i,j}$ signal channel coefficients are known, or can be deduced using known pilot tones, then the original set of launched Symbols can be recovered. This can be achieved, for example, by multiplying the received signals $S_{Rj}$ by the inverse matrix $H^{-1}_{i,j}$ of the signal channel coefficients matrix $H_{i,j}$. A key requirement therefore is that the determinant of the matrix $H_{i,j}$ is not zero in value. This in turn means that the matrix $H_{i,j}$ must be mathematically invertible, that is, non degenerate:

$$S_{T\,j}=H_{i\,j}^{-1}*S_{R\,j}+H_{i\,j}^{-1}*N_j$$

Put another way the set of N dimensional Vectors formed by each of the rows, or alternatively columns are most preferably substantially independent. This means that, ideally, none of the other vectors thus formed can be effectively expressed as a linear weighted sum of any combination of the remaining set of vectors. This alternatively means that in an N-dimensional space, the set of vectors define an N-dimensional volume. The original Symbols can, however, only be recovered provided the signal to noise performance of the data link is good enough such that the Forward Error Correction algorithm applied to the transmitted Symbols can correct sub-symbol errors. The signal to noise requirement for a MIMO system is therefore more demanding than a conventional SISO system employing COFDM, because of the MIMO systems greater complexity.

Figure 9:
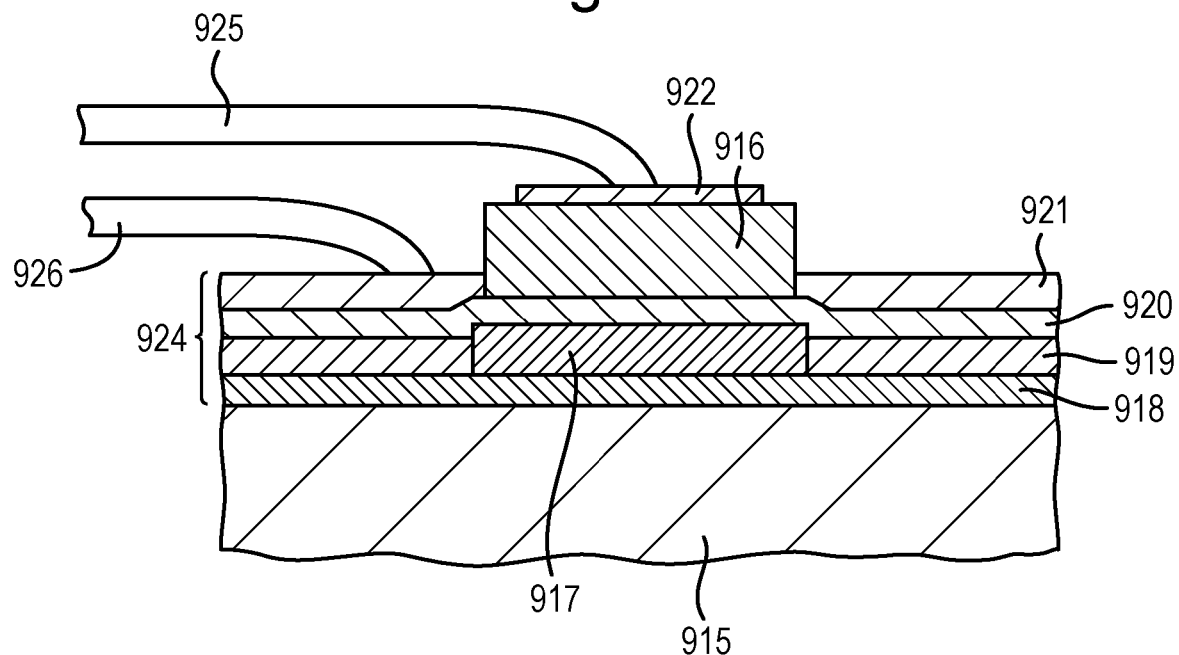
FIG. 9 is a schematic diagram of the layer structure of the enhanced bandwidth transducer layer structure to boost fractional frequency bandwidth that can be used in the first embodiment.

The transducers 107 are a composite structure as illustrated in the example transducer layer structure diagram of FIG. 9. They consist principally of: a single crystal sapphire 915 substrate of acoustic impedance Z=43.67 MRayl; a buffer layer 917 of fused silica of thickness 3.2 μm and acoustic impedance Z=13.13 MRayl., which is used to enhance the frequency bandwidth of the transducer; and a piezoelectric platelet 916 of 36° Y cut lithium niobate of thickness 40 μm. The acoustic impedance of the piezoelectric layer is Z=32.4 MRayl. The acoustical thickness of the piezoelectric layer is $0.541 \wedge$ while that of the buffer layer is $1/18.65 \wedge$, where $\wedge$ is an acoustical wavelength in the material of the respective layers. These wavelengths and impedances are in terms of acoustical signals of 100 MHz frequency. Between each of the above substrates of the structure can be a metallic bonding layer. These include a bonding layer Cr—Au 918 between the sapphire substrate 915 and the fused silica buffer layer 917, and a second bonding layer Cr—Au (70 nm Au) 920 between the buffer layer 917 and the piezoelectric platelet 916. The second bonding layer also provides the electrical ground plane electrode for the piezoelectric layer 916. On top of each bond layer is deposited respectively a Cr—Au (~300 nm Au) thickening layer 919, and then later a second Cr—Au (~300 nm Au) thickening layer 921. These layers protect each of the thin bond metallisation layers 924 during the lapping and thinning processes of first the buffer layer 917 and then the piezoelectric platelet 916. This protection of the original bonding layers is particularly important at the boundary of each bonded structure where abrasive particles can gather during the lapping and polishing processes; such particles could cause an open circuit connection to the ground plane electrode below the bonded transducer. Finally, the structure is completed by a 'live' electrode Au (~100 nm) 922 of nominal thickness 100 nm and an aperture of $1 \times 0.2$ mm$^2$.

Figure 5:
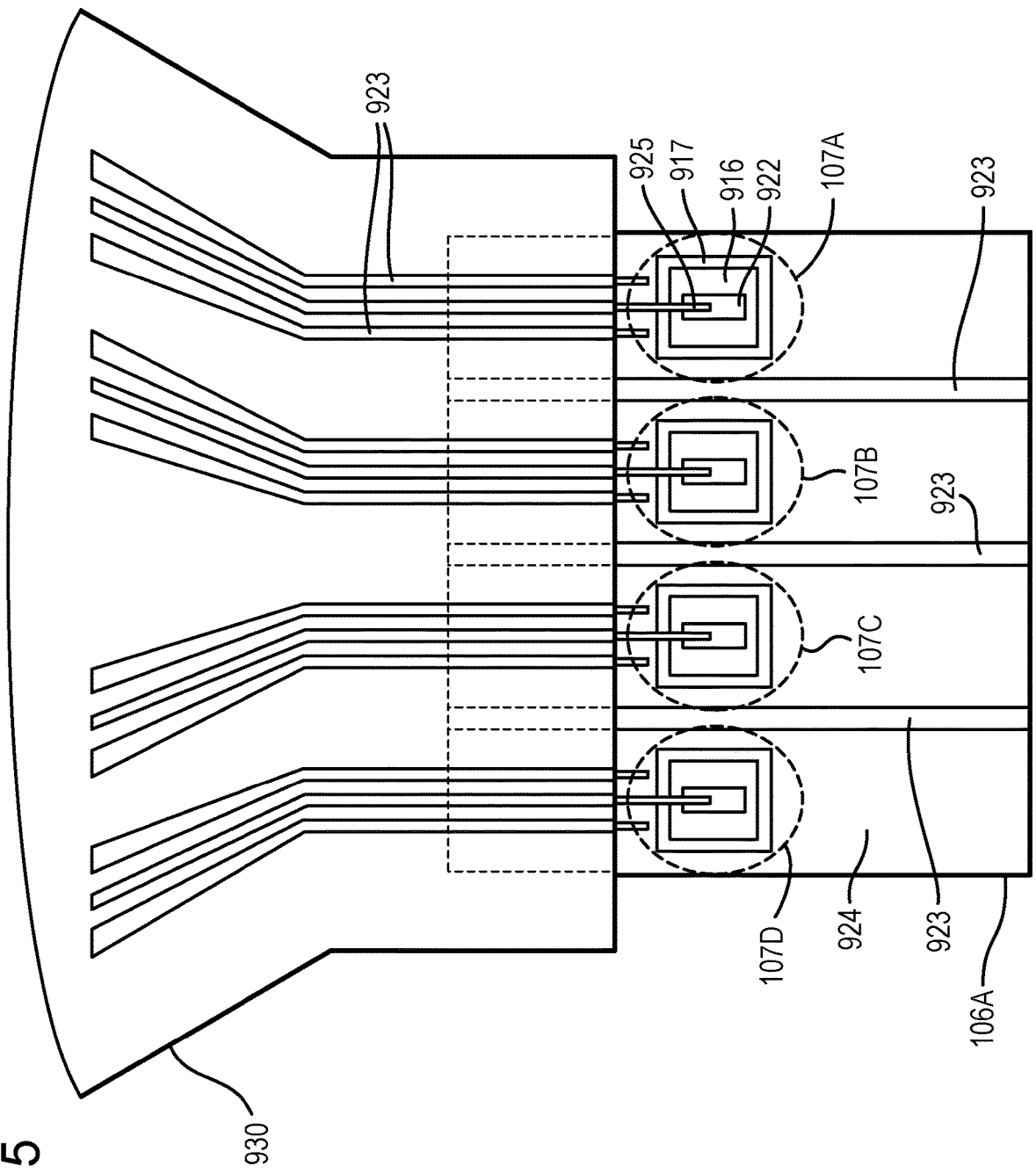
FIG. 5 is a schematic plan view of the first embodiment that shows the layout of the transducers, electrical isolation tracks, the electrical interconnects and an example of a flexi-circuit electrical fan out.

The 'live' wire (or tape) bond 925, and the two 'ground' wire or tape bonds 926 shown in FIG. 9 connect to the 'live' electrode 922, and ground plane metallisation layers 924 to the flexi-circuit electrical fan out 930 shown in FIG. 5. Adjacent transducer channels are electrically isolated on the MIMO devices 106A, 106B by electrical isolation tracks. Their purpose is to suppress inter-channel Tx cross talk created by the sheet resistance of the thin ground plane metallisation layers on the MIMO devices. Inter-channel cross talk is undesirable because it interferes with the spatial orthogonality of the separate data streams transmitted by each transducer channel. The dog leg bends in two of the three isolation tracks shown in FIG. 5 are to ensure that the area of the ground planes available to connect to the four channels of the flexi-circuit electrical fan out is similar for each electrode.

The three substrates making up each transducer 107, 107' are each bonded together in two separate vacuum cold weld bond processes. This vacuum cold weld process is described below.

Referring to FIG. 5, the transducers 107A-107D of the example embodiment are spaced at intervals of 1.6 mm on the MIMO device 106A. The live electrode 922 on each identical transducer consists of a 0.2 mm×1 mm rectangle, with the shortest dimension parallel to the axis of the transducer array. This ensures that the highest far field diffraction occurs along the axis of the transducer array; this ensures a particularly rich multipath signal channel along this axis. The length of the long axis of the transducer is chosen mainly for convenience, in part to reduce the length of the individual transducer platelets needed to accommodate the active electrode, and thus reduce the total loading force required during transducer bonding. Setting the overall area of the transducer live electrode 922 to 0.2 mm$^2$ does however lead to relative high input impedance for the tuned transducer, as explained below.

The width of the transducer electrodes on each transducer 107, 107' is, in wavelength terms, small (e.g. less than $\sim/\sqrt{}2.2$). Therefore, rapid diffraction occurs in the plane perpendicular to the long axis of the transducer 'live' electrode 922. In sapphire the acoustic wavelength varies from ~137.5 μm at 80 MHz to ~91.7 μm at 120 MHz.

Embodiments of the fabrication geometry disclosed herein lend themselves to parallel processing of a block of device chips as illustrated in FIG. 5, which reduces the processing cost of the acoustic MIMO device blanks.

Figure 3:
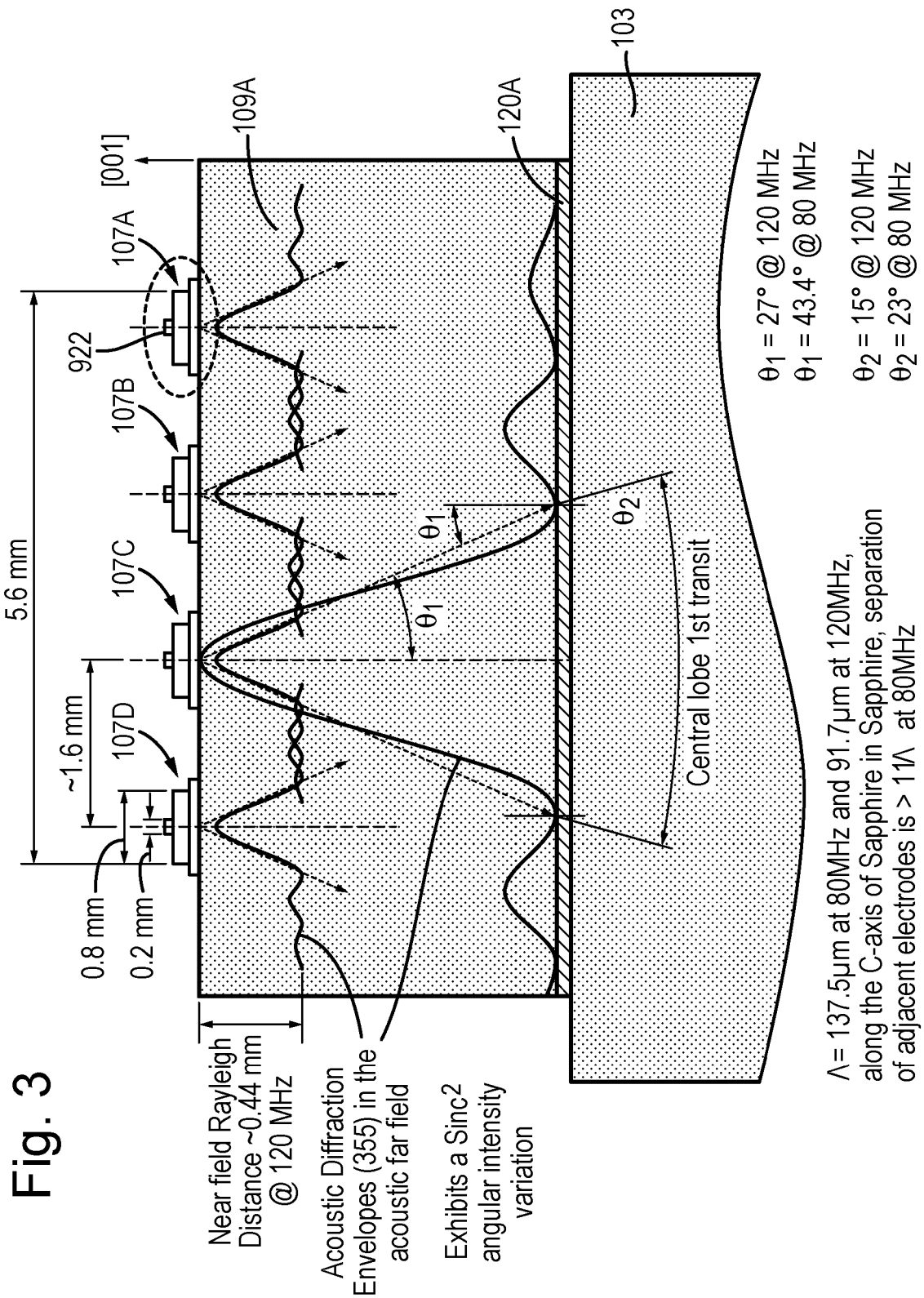
FIG. 3 is a schematic diagram of the first embodiment showing the far field acoustic diffraction envelopes launched by each transducer prior to any multipath interference interactions.

FIG. 3 illustrates the far field acoustic diffraction envelopes 355, etc, that each emanate from an associated electrode channel in each transducer 107, 107', etc., of the example embodiment. The intensity variation of the far field acoustic diffraction patterns as a function of the angle θ from the bore sight of any given transducer electrode of width D is given by:

$$I(\theta) = \text{Sinc}^2\left(\frac{\pi D f \sin\theta}{V_a}\right)$$

where f is the frequency of operation, and $V_a$ is the acoustic velocity equal to ~11,000 m/s along the C-axis of single crystal sapphire.

The near field Rayleigh distance representing the boundary between near field diffraction and far field diffraction is shown in FIG. 3. The transition from the near field where the acoustic beam remains approximately collimated, to the far field where the beam diverges in accordance to the I(θ) =equation above, occurs at ~0.44 mm from each transducer at 120 MHz, and at an even shorter distance at 80 MHz. This Rayleigh distance is given by:

$$L_R = \frac{fD^2}{V_a}$$

Figure 4:
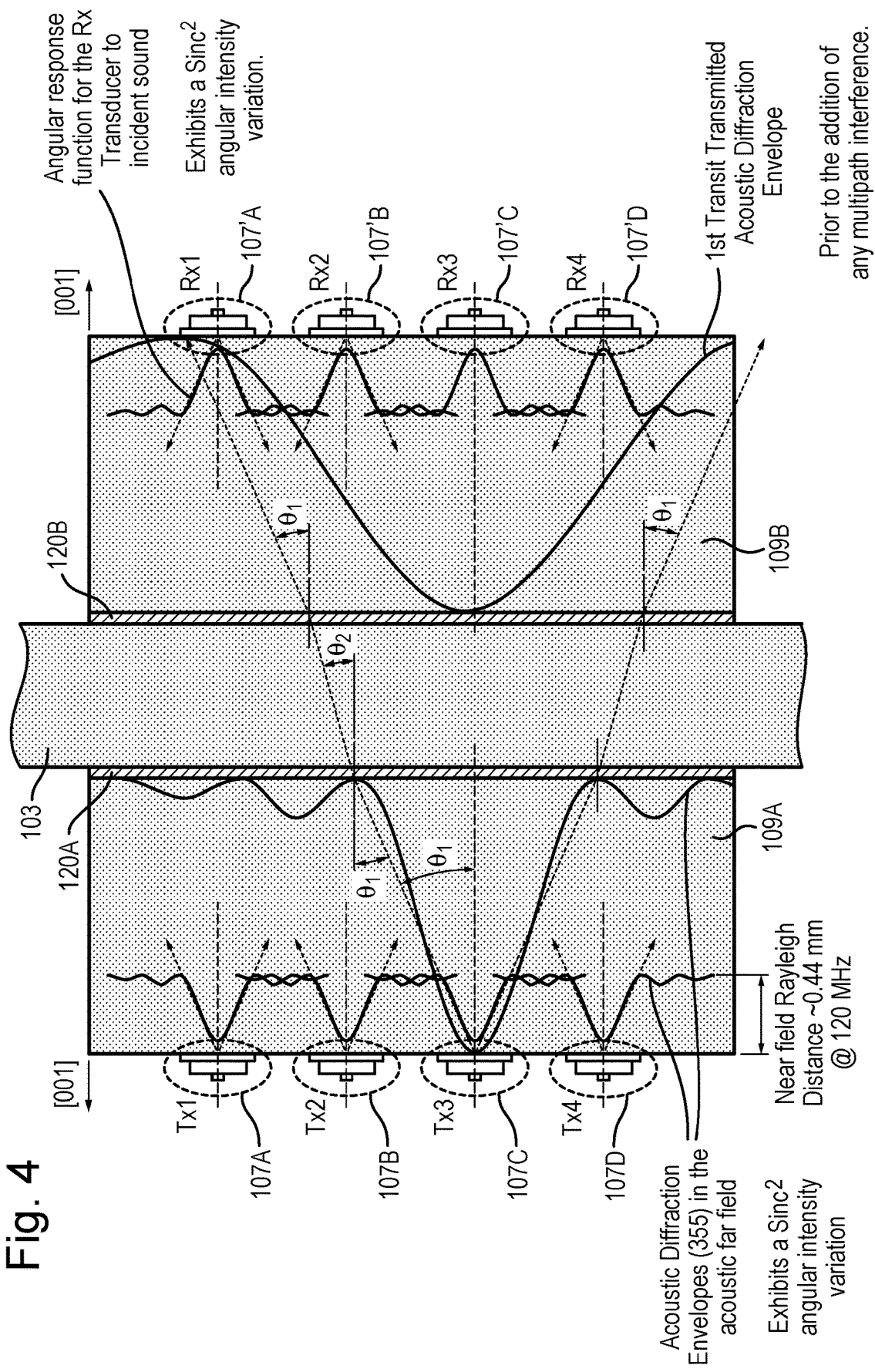
FIG. 4 is a schematic diagram of the first embodiment showing the acoustic illumination of the receiver array.

The full angular width of the far field central diffraction lobe to the zero intensity points is equal to the angle $2\theta_1$ shown in FIG. 3. The full angular width $2\theta_1$ varies from 86.8° at 80 MHz to 54° at 120 MHz within the sapphire crystal blank. Acoustic refraction at the bond interface 120A reduces the corresponding angular width $2\theta_1$ of the central diffraction lobe to 46° at 80 MHz, and 30° at 120 MHz within the barrier. A second refraction process occurs at the second bond interface (6) again increases the full angle angular spread of the central lobe to 86.8° at 80 MHz to 54° at 120 MHz within the second sapphire crystal blank, as illustrated in FIG. 4.

The central diffraction lobe launched by the electrode 5 (channel 1) begins to overlap the bore sight axis of the rightmost electrode (channel 4) at a range of ~11.3 mm at 120 MHz. At all other operating frequencies of embodiment 1 this overlap range is closer.

This means that even a 6 mm tall C-axis single crystal sapphire chip with transducers channels spaced at intervals of 1.6 mm can support one of the primary requirements of an acoustic MIMO communications link 101, namely that every launch electrode can acoustically address every receive electrode. This is partly illustrated by the side view diagram of an acoustic MIMO data link shown in FIG. 4. In practice, multiple acoustic reflections within each device chip would mean that the height of the device blanks could be made substantially lower to achieve this essential goal; namely every Tx transducer via intermediate acoustic reflections can communicate with every Rx transducer.

Figure 7:
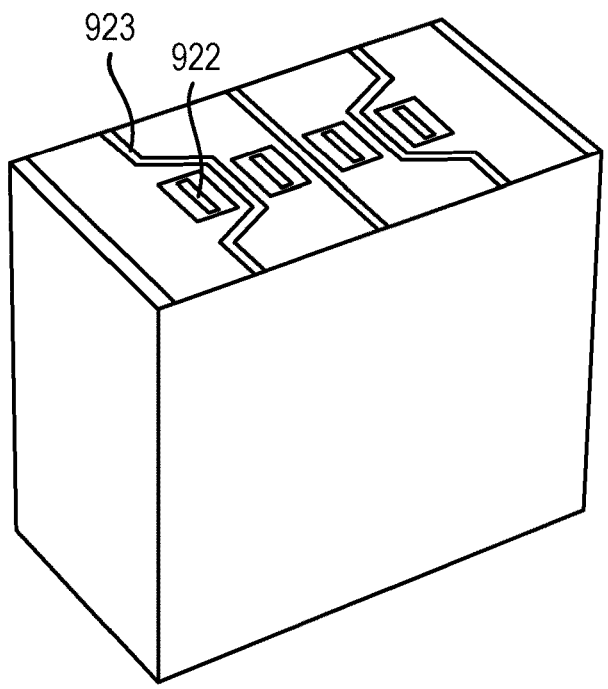
FIG. 7 is an image of an example completed MIMO device at the completion of processing.
Figure 8:
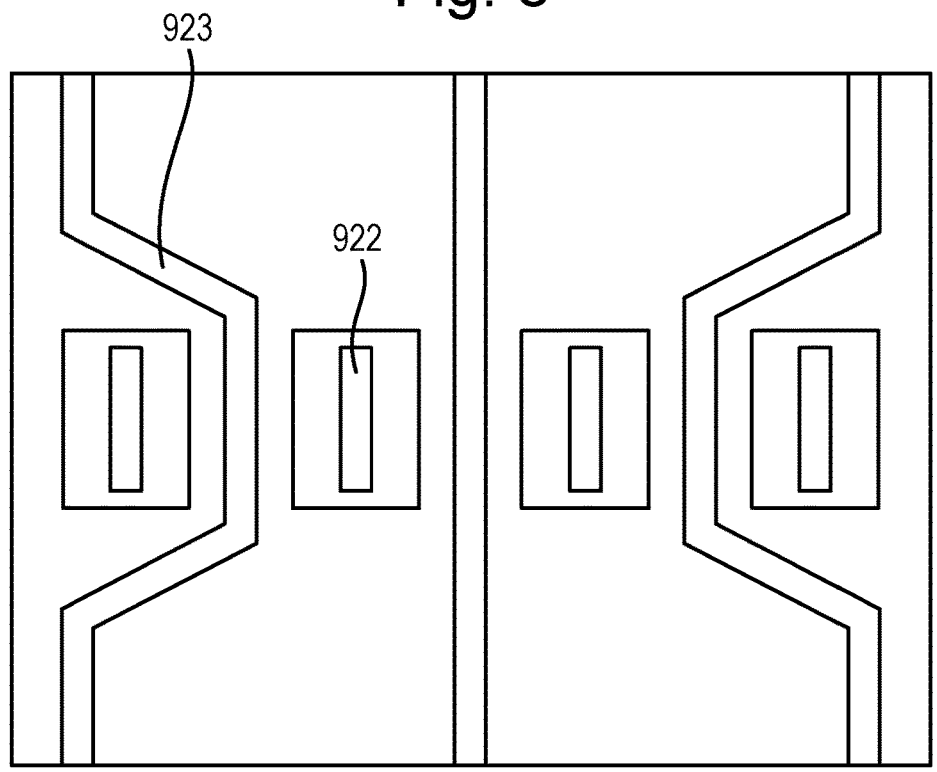
FIG. 8 is a microscope image of the transducer face of the acoustic MIMO device of FIG. 6 showing detail of its transducers, electrodes and electrical isolation tracks.

FIG. 7 shows a prototype device chip with four electrode channels on a fused silica block. Two chips are then bonded to a barrier, one on each side of the barrier to support high data rate ultrasonic communications across the barrier. The separation between adjacent electrodes 922 is 1.6 mm, the height of the device blank is 8 mm.

The approach described above addresses various requirements for achieving a high data rate acoustic MIMO communication system through a barrier. These include:
- A complex multipath signal channel which is a prerequisite for the practical implementation of a high data rate acoustic communication MIMO scheme. MIMO requires signals from the launch transducers to be detected by all of the receiver transducers and then subsequently decoded. Otherwise it is impossible to realise orthogonal spatial channels for supporting improved data rates.
- It supports an array of wide frequency bandwidth $\Delta f$ transducer channels; each with a high fractional bandwidth $\Delta f/f_c$ to reduce the impact of acoustic attenuation losses in the barrier material is required.

Components of the acoustic MIMO data link 101 can be fitted to an (at least partially) existing MIMO communication system, e.g. connected to each side of a barrier positioned between MIMO modems.

The discussion below outlines some of the design considerations involved in the design of an acoustic MIMO-OFDM data link, and the design of the MIMO transceiver device chip.

Centre Frequency of Operation

To achieve the highest possible acoustic data rate link, desirably the Tx and Rx transducers to operate over as wide an overlapping frequency bandwidth as possible. At the same time the centre frequency of the transducers desirably is made as low as possible to reduce the impact of acoustic attenuation within the barrier. Generally, bulk acoustic attenuation within a homogenous and grain structure free material exhibits a quadratic dependence on frequency when expressed in units of dB/cm. However, a lower power law of increase with frequency, albeit from a much higher baseline are quite common. This is because of the impact of extrinsic acoustic attenuation losses such as the presence of impurities or grain boundaries.

The lowest recommended centre frequency $f_c$ for the acoustic data link may be subject to the requirement that the transducer should operate over less than an octave of frequency bandwidth, i.e. $\Delta f/f_c > 0.66\ f_c$. This is particularly the case with complex communications protocols such as COFDM. Such protocols are intended for use in a signal transmission environment characterised by high levels of signal multipath which are caused by reflections off a large number of surfaces. COFDM, however, requires a very linear signal response that is as free as possible from spurious signals created by multiple order non-linear mixing processes. Such mixing processes can occur either in the electronics of the system, or can alternatively be generated by acoustic mixing processes within the propagation medium at very high acoustic power density levels.

The benefit of sub-octave operation is that all spurious signals due to $2^{nd}$ order non-linear mixing effects will lie outside the primary frequency band of operation; such spurious signals include those at $2\ f_1$, $2\ f_2$, or $f_1+f_2$. In band spurious signals due to non-linear mixing effects are then limited to $3^{rd}$ or higher order non-linear mixing effects such as for example two tone third order intermodulation products at frequencies $(2\ f_1-f_2)$, $(2\ f_2-f_1)$, and three tone third order intermodulation products such as $(f_1+f_2-f_3)$, $(f_1+f_3-f_2)$ and all other similar frequency combination permutations. Suppressing the impact of $2^{nd}$ order non-linear mixing processes has the benefit of reducing the linearity requirements for the electronics of the system.

A further practical constraint on the lowest possible centre frequency of operation is that some piezoelectric materials cannot even support a transducer with an octave bandwidth. This is because their electromechanical coupling coefficient $k_t$ is too small. According to Rosenbaum J. F.; 'Bulk Acoustic Wave Theory and Devices', Published 1988, Artech House, Boson London, the relationship between the mechanical Q of a transducer and therefore its fractional bandwidth $\Delta f/f_c$ 3 dB power points, and the electro-mechanical coupling constant $k_t$ is given by:

$$Q = \frac{f_c}{\Delta f} = \frac{\pi}{4k_t^2}\frac{Z_T}{Z_S}$$

where:
$f_c$ is the centre frequency of the transducer
$\Delta f$ is the bandwidth of the transducer
$Z_T$ is the electrical input impedance of the transducer
$Z_S$ is the source output impedance of the electrical power source.

A 36°Y cut lithium niobate transducer has an electromechanical coupling constant $k_t$ of 0.487 for longitudinal acoustic wave generation. So if a 36°Y cut lithium niobate transducer is electrically tuned to be electrically well matched to the electrical power source; i.e. $Z_T=Z_S$, the predicted fractional bandwidth for the transducer 3 dB power points is only 30%.

It is possible in practice to do better than this with careful selection of the layer materials and layer thicknesses, and the electrical matching network. So to achieve a frequency bandwidth of ~40 MHz requires an operating frequency in excess of 80 MHz using 36°Y cut lithium niobate.

The design work discussed below refers to 36°Y cut lithium niobate transducers which were designed to operate at a centre frequency of 100 MHz. The choice of this particular piezoelectric material and the 36°Y cut in particular was determined by the requirement to transmit longitudinal polarised acoustic waves. These waves exhibit much lower acoustic attenuation, particularly in metallic barriers, than a shear polarised wave.

Choice of Frequency Bandwidth Δf

The data transfer rate that is supportable by an acoustic MIMO device data link is dependent on the available frequency bandwidth of the link, and signal communications protocol used. Most COTS MIMO communications hardware are designed to operate over frequency bandwidths that are multiples of 20 MHz or 10 MHz. Bandwidths typically used are 20 MHz, 40 MHz, 80 MHz and 160 MHz. For most applications an 80 MHz or 160 MHz bandwidth is not practical due to the particularly high centre frequencies, ≥160 MHz or ≥320 MHz needed to support these bandwidths. This is a consequence of the typical ~50% fractional bandwidth $\Delta f/f_c$ performance limit of 36°Y cut lithium niobate piezoelectric transducers. Such high centre frequencies suffer from extremely high frequency dependent attenuation in most barrier materials.

However, attenuation and transducer modelling has shown that in thin 10 mm thick barriers of aluminium, that a 40 MHz bandwidth is supportable at a centre frequency of 100 MHz. Separately, previous experimental work by the present inventor has shown that 20 MHz bandwidth signals can be transmitted successfully through large thicknesses of NQ1 steel, in excess of 45 mm at a centre frequency of 40 MHz.

A centre frequency of 100 MHz was chosen for the example embodiment representing a MIMO data link intended to work through a 10 mm thick aluminium barrier.

The Choice of Transducer Mounting Configuration

Consider, for example, a MIMO chip designed to operate at centre frequency of 100 MHz and a bandwidth of 40 MHz using a 36°Y cut lithium niobate transducer. If the transducer was bonded directly onto the barrier with an adhesive, then the bond thickness would need to be less than 0.1 μm thick to support a wide fractional bandwidth $\Delta f/f_c$ response.

The requirement for a very thin bond layer is a consequence of the extremely large acoustic impedance mismatch between 36°Y cut lithium niobate (Z~32.4 MRayl) of the Piezoelectric layer, and a typical epoxy resin adhesive such MasterBond Inc's EP30 (Z~1.97 MRayl); NB. 1 MRayl=$10^6$ kg m$^{-2}$ s$^{-1}$.

As a result the transducer bond layer is acoustically highly reflecting unless the adhesive bond layer is made extremely thin. Consequently, the mechanically vibrating transducer structure will have a very high mechanical Q unless the adhesive bond layer is less than $1/165 \lambda$ thick at the centre frequency of 100 MHz. Particulate contamination outside a cleanroom processing environment would realistically preclude the achievement of such a thin bond layer. It is in part for this reason that the transducer must be bonded to a substrate in a cleanroom environment. Here a good bonding solution is for example a vacuum cold weld metallic bond of controlled thickness. This substrate then in turn is mounted on the barrier.

The other major reason for mounting the transducers on a separate block of a low acoustic loss material is to provide a reverberation chamber to support the creation of a rich multipath signal environment across the MIMO-OFDM data link. Thus, contrary to conventional thinking in the art, a thick adhesive bond that is highly reflecting between the MIMO transceiver device/chip and the barrier is now a virtue not a hindrance.

It can be possible to modify the effective reverberation period in each transceiver device by adding a controlled absorbing layer on the outer exposed surfaces of the device. Such an absorbing layer could be applied over part of the transducer face's metallisation layers to speed the rate of decay of multipath signals within the transceiver device. Such absorbing layers can be achieved by adding a layer of epoxy of controlled thickness that is doped with tungsten particles.

Block processing Manufacture of Device Chips

Figure 6:
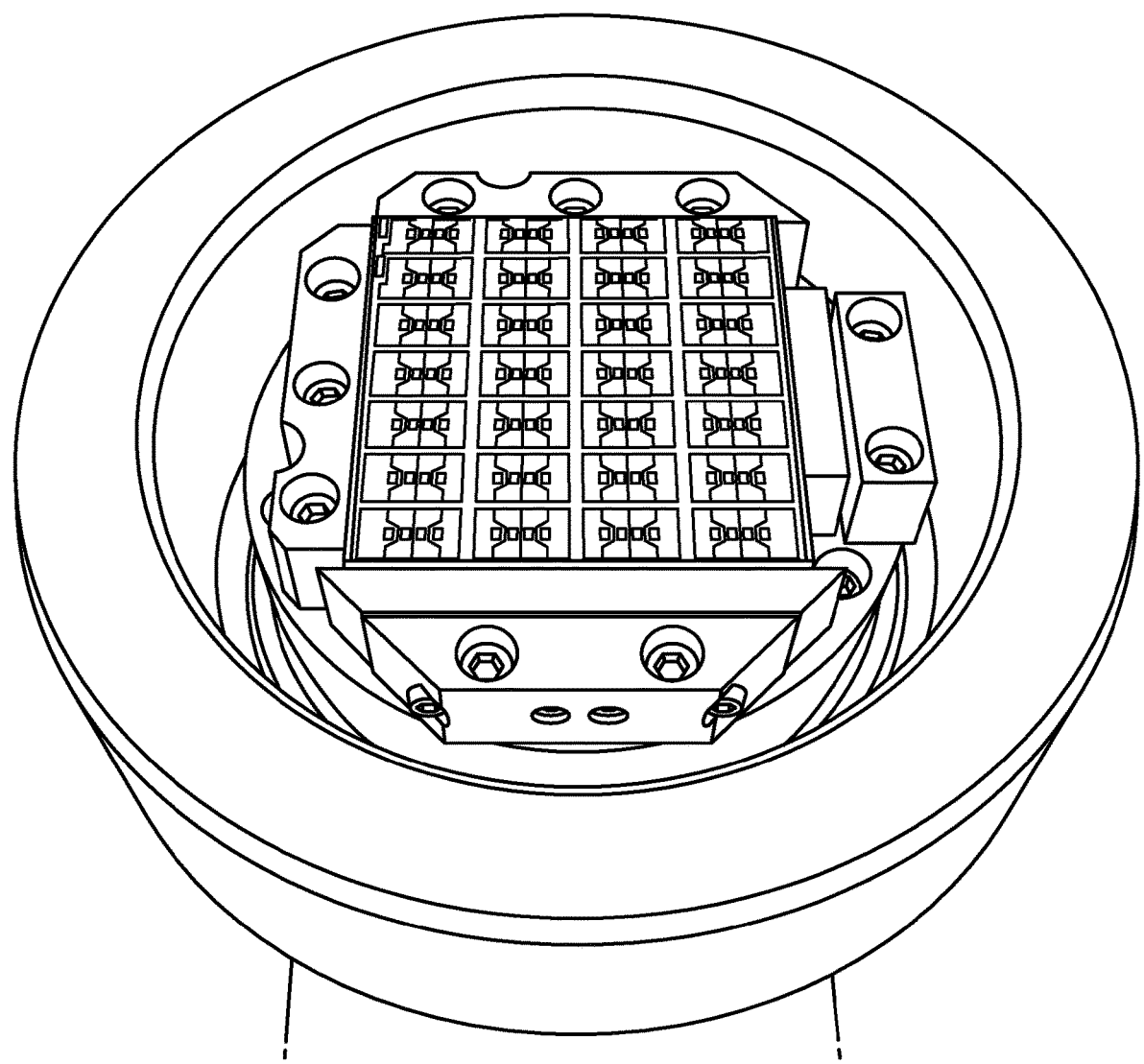
FIG. 6 is an image of a block of identical acoustic MIMO devices arranged in a 4 by 7 array when mounted in an optical polishing jig during processing.

A further benefit of embodiments of the approach described herein is that block processing techniques can be employed to substantially reduce the unit price of the acoustic data links. Arrays of device chips on a single block are all processed in parallel. Block processing techniques can be employed successfully as illustrated in FIG. 6. This shows a pre-prototype block of device chips in a 4 by 7 array while mounted in an optical polishing jig. The polishing jig in this specific case was used to simultaneously thin all of the device transducers, a total of 112 transducer platelets for 28 device blanks, to a common thickness. FIG. 7 shows an individual device chip after dicing up of the processed block of devices, including the detail of the bonded transducers, the electrical isolation tracks between each adjacent transducer, and their sputtered electrodes. The substrate used in these device chips was fused silica, while the bonded transducers were made from 36°Y cut lithium niobate. No intermediate buffer layer of the type indicated in FIG. 9 was used on these device chips because the main substrate was fused silica and not sapphire for reasons of cost. If a substrate with higher acoustic impedance than the transducer material was used, then it could be very beneficial for the frequency bandwidth to use an intermediate buffer layer between the piezoelectric layer and the main substrate.

Processing of the device chips can begin by taking a rectangular block of optically polished material with a surface finish of better than 10-5 scratch dig. The block is first cleaned to remove all surface contamination particularly on the transducer mounting surface. A rectangular array of transducer platelets are then bonded onto it using a vacuum cold weld bonding process in a class 10 cleanroom (equivalent to ISO 4 standard). Inspection of the microscope photograph of FIG. 7 shows that the resulting relative alignment and spacing of the bonded transducers is very accurate, in this case to better than +/−0.1 mm. The length and width of the each bonded transducer platelet in the photograph is 5.68 mm×1.28 mm. The pitch between adjacent transducers was 1.6 mm. This linear pitch corresponds to an acoustic spacing of ~21.4 acoustic wavelengths at 80 MHz within the fused silica main substrate.

The vacuum cold weld process can involve evaporating a thin keying layer of evaporated chrome of nominal thickness 10 nm, followed immediately by a thicker controlled thickness of 35 nm of gold onto the two surfaces to be bonded together. Each of the surfaces to be bonded must be highly polished to ~10-5 scratch dig finish, flat to better than λ/20 per cm at 633 nm. All surfaces of the substrates must be very clean, and the bonding surfaces free of particulate contamination. The bonding process is performed in a vacuum chamber pumped down to a residual pressure of better than $3 \times 10^{-7}$ or better mBar. Sputtered or evaporated chrome, unlike sputtered gold, keys strongly to dielectrics such as sapphire, YAG, or fused silica. The two freshly metallised surfaces are then brought carefully together while still under a vacuum of $3 \times 10^{-7}$ or better mBar, then when in contact subjected to a sustained high pressure load. Neither the buffer layer, nor the subsequent piezoelectric platelet, is bonded at their final design thicknesses. Instead, relatively thick platelets typically ~1 mm thick are bonded. The bonded platelets are then lapped and optically polished to their final design thickness. Electrical isolation of the individual ground planes for each bonded transducer platelet are created by either an Ion Beam Milling etching process, or alternatively but less good, a wet etching process. Electrodes of a Chrome flash followed by a 100 nm thick gold layer are then deposited onto each of the bonded transducers through a photolithography mask. The final task is to dice the completed block into individual device chips using for example a wafer saw.

Device Symmetry Geometry

In some embodiments the mounting of the MIMO device may not be perfectly symmetrical as shown in FIG. 4. For example, for a perfectly fabricated pair of device blanks, and a uniform bond layer thickness there could be perfect symmetry in the acoustic signal transmission properties for the right most electrode and the left most electrode. So, the signal channel coefficients $H_{i,j}$ would become symmetric, that is the coefficients $H_{i,j}=H_{j,i}$. In practice, perfect symmetry will never be achieved since this would imply placement accuracies of better than 10 μm which is not realistic.

However, there is still potentially a benefit in utilising a non-periodic and non-symmetric transducer placement of the transducer electrodes. This breaks the symmetry for a 4×4 MIMO system where, for example, the left most antennae could be exactly equivalent to the right most antennae in terms of signal channel characteristics. An alternative method would be to have a variable bonding layer across the array axis of MIMO transceiver devices/chips 106A or/and 106B. If the bond layer were wedged, then this would again break the potential symmetry for a 4×4 MIMO system.

Attention is directed to any papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A data link for a multiple inputs multiple outputs (MIMO) communication system, the data link comprising:
    a first transceiver device comprising a body having a transducer mounting surface near or at which is mounted a plurality of first transducers, the first transducers configured to, in use, receive and convert a plurality of electrical waveforms to a respective plurality of acoustic signals;
    a first bonding layer configured to, in use, bond a barrier mounting surface of the body of the first transceiver device opposite its transducer mounting surface to a barrier through which the plurality of acoustic signals output by the first transceiver device is transmitted;
    a second transceiver device comprising a body having a transducer mounting surface near or at which is mounted a plurality of second transducers, the second transducers configured to, in use, receive and convert the plurality of acoustic signals transmitted through the barrier to a respective plurality of electrical waveforms, and
    a second bonding layer configured to, in use, bond a barrier mounting surface of the body of the second transceiver device opposite to its transducer mounting surface to the barrier,
    wherein a thickness of the first bonding layer and/or the second bonding layer is such that, in use, periodic transmission maxima occur outside a frequency bandwidth Δf of a channel of the acoustic signal.

2. The data link according to claim 1, wherein the body of the first transceiver device and the body of the second transceiver device each comprise sapphire or single crystal sapphire.

3. The data link according to claim 1, where, in use, the body of the first transceiver device and the body of the second transceiver device function as reverberation chambers for the acoustic signals.

4. The data link according to claim 1, wherein a thickness of the first bonding layer and/or the second bonding layer is within a range of 4.0 μm to 4.30 μm, or within a range of 12.2 μm to 12.5 μm.

5. The data link according to claim 1, wherein the thickness of the first bonding layer and/or the second bonding layer is determined as a function of a centre frequency of a channel of at least one of the acoustic signals, and as a function of a power averaged angle of incidence of a total ensemble of multipath signals in the channel.

6. The data link according to claim 1, wherein the first bonding layer and/or the second bonding layer comprises a low acoustic loss layer including one or more of sapphire, single crystal sapphire, yttrium aluminum garnet (YAG), and fused silica.

7. The data link according to claim 1, wherein the first bonding layer and/or the second bonding layer comprises a resin material doped with spacer material.

8. The data link according to claim 1, wherein the first bonding layer and/or the second bonding layer comprises an acoustic coupling gel or fluid.

9. The data link according to claim 1, wherein the body of the first transceiver device and the body of the second transceiver device each comprises a block or is cuboid in shape.

10. The data link according to claim 9, wherein at least one wall surface extends between the transducer mounting surface and the barrier mounting surface of the body of the first transceiver device, and at least one wall surface extends between the transducer mounting surface and the barrier mounting surface of the body of the second transceiver device.

11. The data link according to claim 10, wherein at least one dimension of a said transducer mounting surface is relatively smaller than at least one corresponding dimension of a said wall surface.

12. The data link according to claim 1, wherein an electrode of each of the plurality of first transducers is rectangular or elliptical or diamond in shape, with a shortest dimension of the shape being parallel to a main axis of the plurality of first transducers.

13. The data link according to claim 1, wherein positions of the plurality of first transducers is non-periodic and non-symmetric with respect to positions of the plurality of second transducers.

14. A MIMO communication system comprising the MIMO data link according to claim 1, the system further comprising:
a first MIMO modem configured to, in use, receive and convert an input signal to output the plurality of electrical waveforms to the first transceiver device; and
a second MIMO modem configured to, in use, receive and convert the plurality of electrical waveforms output by the second transceiver device to produce an output signal.

15. The data link according to claim 1, wherein a thickness of the first bonding layer and/or the second bonding layer is 4.15 µm, or is 12.35 µm.

16. The data link according to claim 1, wherein the first bonding layer and/or the second bonding layer comprises a resin material doped with micro-pearl spheres or polymer spheres.

17. The data link according to claim 1, wherein the first bonding layer and/or the second bonding layer comprise a solder joint.

18. The data link according to claim 17, wherein the solder joint comprises spacer particles.

19. The data link according to claim 1, wherein an electrode of each of the plurality of first transducers has a shape, with a shortest dimension of the shape being parallel to a main axis of the plurality of first transducers.

20. A data link for a multiple inputs multiple outputs (MIMO) communication system, the data link comprising:
a first transceiver device comprising a body having a transducer mounting surface near or at which is mounted a plurality of first transducers, the first transducers configured to, in use, receive and convert a plurality of electrical waveforms to a respective plurality of acoustic signals;
a first bonding layer configured to, in use, bond a barrier mounting surface of the body of the first transceiver device opposite its transducer mounting surface to a barrier through which the plurality of acoustic signals output by the first transceiver device is transmitted;
a second transceiver device comprising a body having a transducer mounting surface near or at which is mounted a plurality of second transducers, the second transducers configured to, in use, receive and convert the plurality of acoustic signals transmitted through the barrier to a respective plurality of electrical waveforms, and
a second bonding layer configured to, in use, bond a barrier mounting surface of the body of the second transceiver device opposite to its transducer mounting surface to the barrier,
wherein a thickness the first bonding layer and/or the second bonding layer is determined, in use, as a function of a centre frequency of a channel of the acoustic signal and as a power averaged angle of incidence of a total ensemble of multipath signals in the channel.

\* \* \* \* \*